(12) United States Patent
Salomon-Bahls (10) Patent No.: US 7,581,763 B2
(45) Date of Patent: Sep. 1, 2009

(54) CONNECTOR DEVICE FOR PIPES

(75) Inventor: Bernd Salomon-Bahls, Halver (DE)

(73) Assignee: Voss Automotive GmbH, Wipperfurth (DE)

( * ) Notice: Subject to any disclaimer, the term of this patent is extended or adjusted under 35 U.S.C. 154(b) by 135 days.

(21) Appl. No.: 10/528,215

(22) PCT Filed: Sep. 23, 2003

(86) PCT No.: PCT/EP03/10555

§ 371 (c)(1), (2), (4) Date: Mar. 17, 2005

(87) PCT Pub. No.: WO2004/029497

PCT Pub. Date: Apr. 8, 2004

(65) Prior Publication Data

US 2005/0258645 A1 Nov. 24, 2005

(30) Foreign Application Priority Data

Sep. 24, 2002 (DE) .................................. 202 14 847

(51) Int. Cl.
*F16L 21/06* (2006.01)

(52) U.S. Cl. ........................ 285/322; 285/104; 285/108; 285/243; 285/307

(58) Field of Classification Search .................... 285/95, 285/104, 108, 243, 305, 307, 319, 322–323, 285/423, 921, 915
See application file for complete search history.

(56) References Cited

U.S. PATENT DOCUMENTS

| 3,724,880 | A | | 4/1973 | Seller | |
|---|---|---|---|---|---|
| 4,431,216 | A | * | 2/1984 | Legris | ........................ 285/104 |
| 5,366,260 | A | | 11/1994 | Wartluft | |
| D372,074 | S | * | 7/1996 | Wallace et al. | .............. D23/269 |
| 5,711,550 | A | * | 1/1998 | Brandt | ........................ 285/101 |

FOREIGN PATENT DOCUMENTS

EP  0 733 844  9/1996
EP  1 199 506  4/2002

* cited by examiner

*Primary Examiner*—Aaron M Dunwoody
*Assistant Examiner*—Fannie Kee
(74) *Attorney, Agent, or Firm*—Brinks Hofer Gilson & Lione (57) ABSTRACT

A connecting device for a plug-in connection of at least one pipeline having a housing part having at least one receiving opening for the insertion of the pipeline. A clamping ring is arranged in the receiving opening and, in order to lock the pipeline in place, interacts with an inner cone of the housing part. The housing part is made in two parts including a base part and an insert part, which is connected to the base part via a snap-in action forming-fitting connection. The insert part has a direct seal for resting on the circumference of the inserted pipeline. The insert part is formed of a first relatively hard and dimensionally stable plastic material, and has a dirt seal which consists of a second, relatively soft and elastic plastic material and is molded directly into the first material as a single piece with a cohesive material joint therebetween.

3 Claims, 7 Drawing Sheets

CONNECTOR DEVICE FOR PIPES

CROSS REFERENCE TO RELATED APPLICATIONS

This application claims priority to DE 202 14 847.5, filed Sep. 24, 2002, and PCT/EP03/10555, filed Sep. 23, 2003.

FIELD OF THE INVENTION

The present invention relates to a connecting device for the plug-in connection of at least one pipeline (pipeline or hose line for gases or liquids). The device includes a housing part having at least one receiving opening for the insertion of the pipeline, and a slotted and, as a result, radially elastically deformable clamping ring, which is arranged in the receiving opening and, in order to lock the pipeline in place, interacts via an outer cone with an inner cone of the housing part. The housing part is made in two parts from a base part and an insert part, which is connected to the latter via a snap-action form-fitting connection and has the inner cone, and the insert part having a dirt seal for resting on the circumference of the inserted pipeline.

BACKGROUND OF THE INVENTION

A connecting device of the general type of this application is disclosed in EP 0 733 844 B1. In this case, the insert part consists of a single-piece plastic molded part, a dirt seal, which is intended to prevent dust, dirt, moisture (spray water) and the like from penetrating, being molded onto it as a single piece as an encircling sealing lip. Before the pipeline is inserted, this sealing lip extends obliquely radially inward in the insertion direction in such a manner that it is somewhat elastically widened by the inserted pipeline and then rests against it in a sealing manner. For the purpose of being able to release the pipeline, the insert part here has two elastic latching arms which engage with latching attachments into the base part and into latching openings formed there. Each latching arm has an actuating section which protrudes outward from the base part. This known connecting device has essentially been well tried and tested, but, in particular, the dirt seal is still not optimal. In addition, the protruding actuating attachments of the latching arms may be obstructive or may even result in an unintentional release.

The present invention is based on the object of further improving a connecting device of the described generic type in respect of its use properties using economical means.

SUMMARY OF THE INVENTION

According to the invention, the above objects are achieved by the insert part consisting of a first, relatively hard and dimensionally stable plastic material and by the dirt seal, consisting of a second, relatively soft and elastic plastic material, being molded directly onto it as a single piece with a cohesive material joint. This advantageous configuration makes it possible for the dirt seal to be designed specifically in terms of shape and/or material to provide an optimum sealing function. For example, use can be made of a soft and elastic material which is optimally suitable for the seal, and it is also possible for favorable shapes, in particular bead-like annular cross sections to be realized, as a result of which a good sealing action is obtained when resting on the circumference of the pipeline. In addition, this configuration also permits an easy pushing-in and, if appropriate, pulling-out of the pipeline because, in contrast to lip seals, in the case of bead seals relative pushing movements cannot result in damaging deformations of the seal. The insert part itself can be designed for optimum mechanical properties through the selection of a suitable material, this being of significance in particular for the supporting of the clamping ring. However, the insert part according to the invention can nevertheless be produced cost effectively in a two-component injection molding process.

For a good sealing against dirt, it is furthermore advantageous if the insert part is of sleeve-shaped design and is inserted or can be inserted into a widened portion of the receiving opening of the base part, in particular with a press fit, and hence in a manner such that it provides a seal at least against the penetration of dirt and similar foreign bodies. In this case, the insert part, in the inserted state, preferably lies completely within the base part and ends flush on the opening side. By means of this advantageous configuration, an optimum sealing against the penetration of dirt, moisture and similar foreign bodies is achieved, even in the connecting or contact region between the inserted insert part and the base part completely accommodating the latter. The completely recessed arrangement of the insert part within the base part results in a very compact constructional form without protruding parts which could otherwise result in practical use in collisions with other parts in the region surrounding the connecting device or even—in the case of a releasable configuration of the insert part—to an unintentional release of the pipeline.

Further advantageous refinement features of the invention are contained in the subclaims and in the description below.

BRIEF DESCRIPTION OF THE DRAWINGS

The invention will be explained in more detail below with reference to a plurality of preferred exemplary embodiments which are illustrated in the drawing, in which.

DETAILED DESCRIPTION OF THE INVENTION

In the various figures of the drawing, identical parts are always provided with the same reference numbers, so that every description of a part which may appear only once with reference to a certain figure of the drawing also applies analogously to the other figures of the drawing in which the part with the corresponding reference number can likewise be seen.

Figure 1:
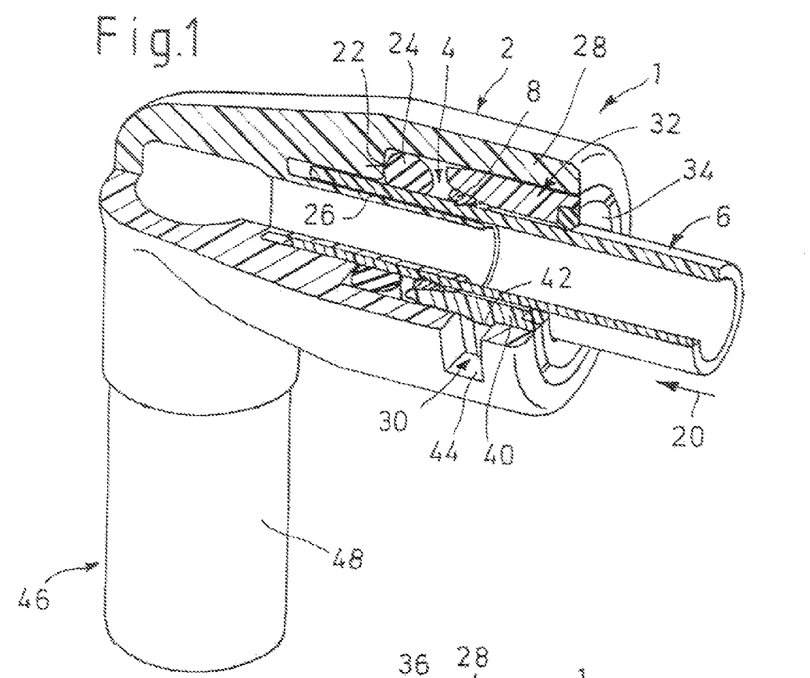
FIG. 1 shows a partially cut-open perspective view of a first embodiment of a connecting device according to the invention.
Figure 2:
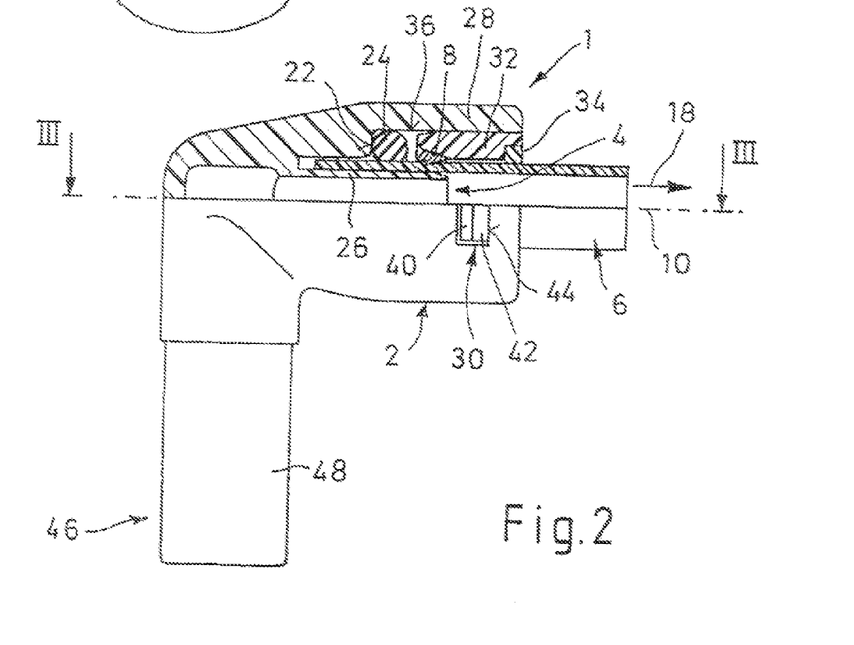
FIG. 2 shows a partially cutaway side view of the embodiment according to FIG. 1.
Figure 3:
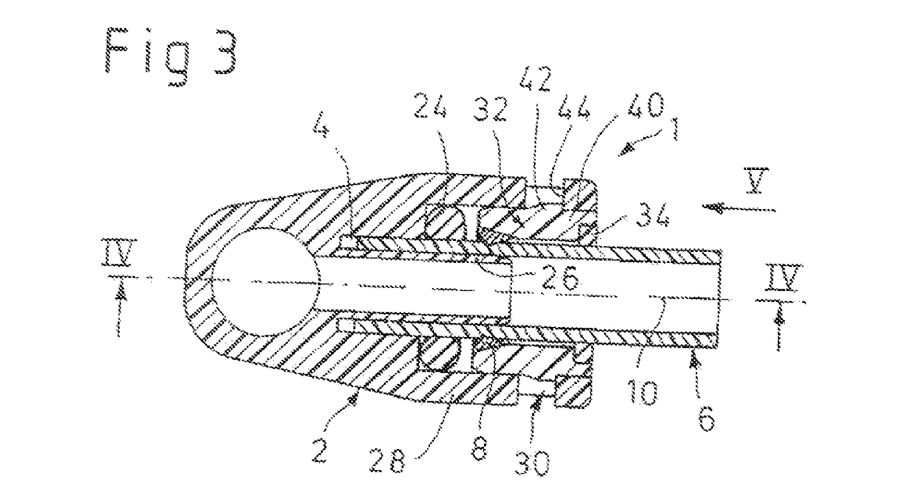
FIG. 3 shows a section in the plane III-III according to FIG. 2.
Figure 4:
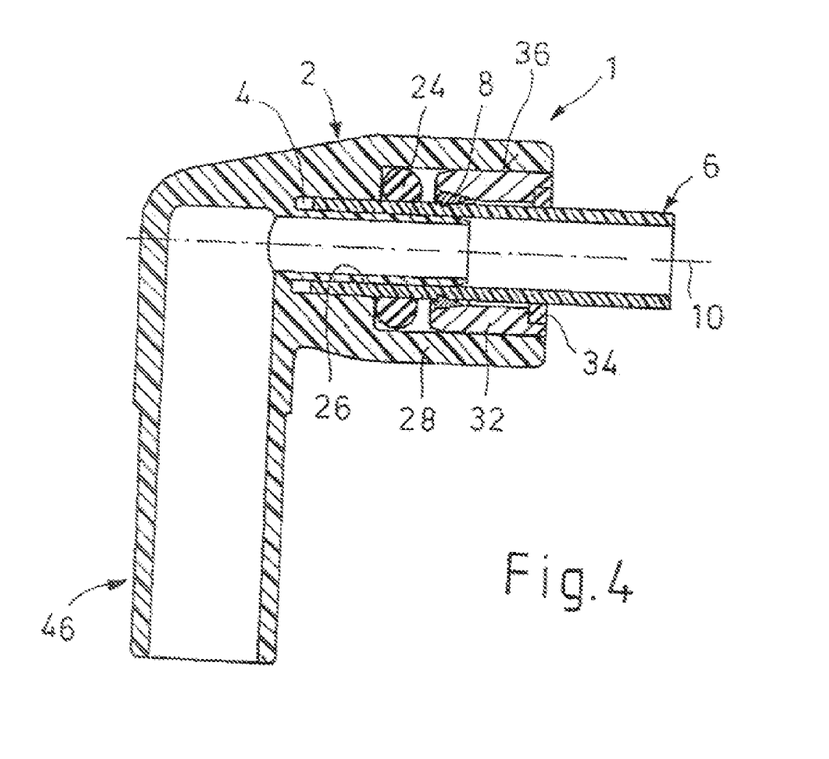
FIG. 4 shows a section in the plane IV-IV according to FIG. 3.
Figure 5:
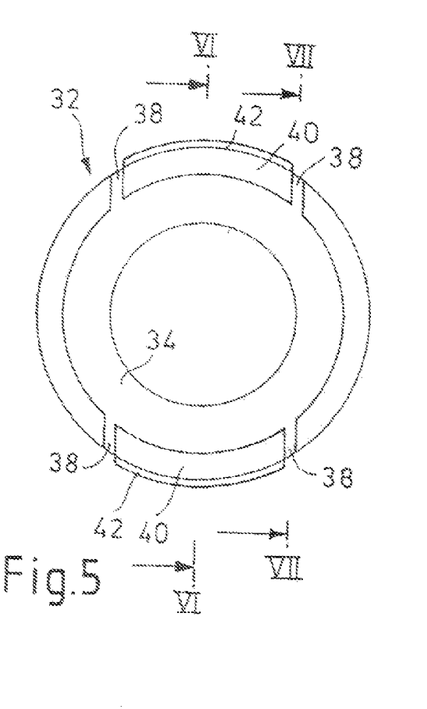
FIG. 5 shows an enlarged end view just of the separate insert part in the arrow direction V according to FIG. 3.

In all of the exemplary embodiments, a connecting device 1 according to the invention comprises a housing part 2 with a receiving opening 4, which is open on one side, for the axial insertion of an end of a pipeline 6, and of a clamping ring 8, which is arranged in the housing part 2 or in the receiving opening 4 and is intended for locking the pipeline 6, which is inserted axially, i.e. in the direction of a plug-in axis 10, in place. In this case, the connecting device 1 permits a simple and rapid installation of the pipeline 6, which consists in particular of plastic, by simple insertion into the housing part 2 without other installation steps. The clamping ring 8 sits in a widened portion of the receiving opening 4 in such a manner that it surrounds the receiving opening 4 and therefore the inserted pipeline 6. At one point of its circumference, the clamping ring 8 has a slot which passes axially and radially through it, i.e. an interruption in its circumferential profile, as a result of which it can be radially elastically widened and/or constricted. In its inner circumferential region, the clamping ring 8 has—see in this respect in particular the larger illustrations in FIGS. 12, 14, 16 and 18—(at least) one radially inwardly protruding, encircling tooth edge 12. The clamping ring 8 furthermore has an outer cone 14 which, in order to lock the pipeline 6 in place, interacts with an inner cone 16 of the housing part 2 in such a manner that, when there is a pull on the pipeline 6 in the release direction (arrow direction 18 in FIG. 2), i.e. when there is a movement counter to the insertion direction (arrow 20 in FIG. 1), the clamping ring 8 is initially carried along by means of the frictional bearing of its tooth edge 12 until an outer cone 14 comes to rest in the inner cone 16 of the housing part 2. If the pulling continues, a radially inwardly directed force is produced via the cones 14, 16, by means of which force the clamping ring 8 to be elastically constricted, so that the tooth edge 12 interacts with the essentially smooth-faced, cylindrical outer circumference of the pipe in a frictional and/or form-fitting manner and the pipe is thus locked in place to prevent it from being pulled out.

For the pressure-tight sealing of the pipeline 6, a sealing ring 24 (pressure seal) is arranged within the housing part 2 in the region between the clamping ring 8 and a hole step 22. In addition, a supporting sleeve 26 which is coaxial with the plug-in axis 10 is preferably arranged within the housing part for the frictional engagement in the inserted pipeline 6. The supporting sleeve 26 therefore supports, from the inside, the pipeline 6 placed on to it, on the one hand, against the radial force applied via the clamping ring 8 and, on the other hand, also against the bearing force of the sealing ring 24. As a result, the connecting device 1 according to the invention is, in principle, also suitable for hose lines.

For the purpose of being able to produce and fit the connecting device 1, the housing part 2 is made in two parts from a base part 28 and an insert part 32, which is connected to the latter via a snap-action form-fitting connection 30 (form-fitting latching connection with an active-surface undercut angle of greater/less than 90°) and has the inner cone 16. The insert part 32 has a dirt seal 34 for resting on the circumference of the inserted pipeline 6.

Figure 6:
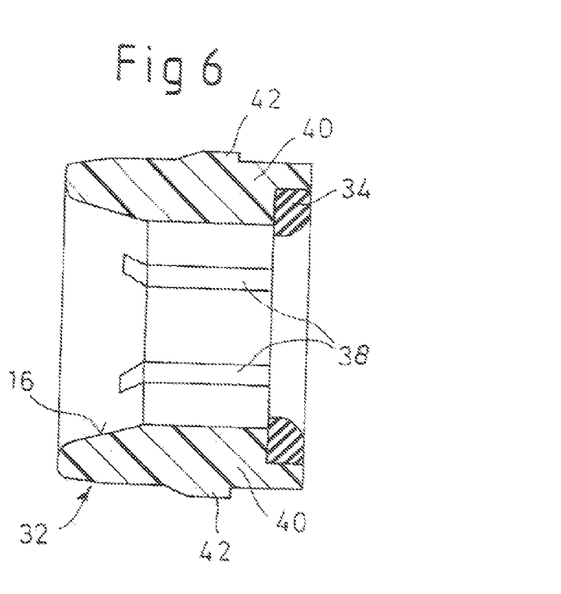
FIG. 6 shows a section in the plane VI-VI according to FIG. 5.

According to the invention, the insert part 32 having the dirt seal 34 is formed as a single-piece two-component molded part from two different plastic materials, to be precise, the insert part 32 consists of a first, relatively hard and dimensionally stable plastic material while the dirt seal 34, consisting of a second, relatively soft and elastic plastic material, is molded directly onto it as a single piece with a cohesive material joint. The plastic material is preferably a thermoplastic elastomer (TPE). In this case, the dirt seal 34, see in this respect in particular FIG. 6, has, on its radially inwardly pointing side, a bead-like sealing region for resting on the circumference of the pipeline 6.

The insert part 32 together with the dirt seal 34 is overall of essentially sleeve-shaped design and is inserted or can be inserted into a widened portion 36 of the receiving opening 4 of the base part 28, preferably with a press fit, and hence in a manner such that it provides a seal at least against the penetration of dirt and similar foreign bodies. In this case, it is particularly advantageous if the insert part 32, in the inserted state, lies completely within the base part 28 and ends flush on the opening side. The result is an advantageously compact constructional form of the connecting device 1 which, on the opening side, has a planar end surface which is closed toward the pipeline 6 via the dirt seal 34.

The snap-action form-fitting connection 30 may be a closed latching element design (not illustrated) encircling in the circumferential direction, which, because of the form-fitting connection achieved (undercut $\geq 90°$), results in the pipeline not being able to be released.

However, for the purpose of being able to release the pipeline 6, provision is made in the preferred embodiments illustrated for the sleeve-shaped insert part 32—see in this respect in particular the separate, enlarged illustrations in FIGS. 5 to 7 and FIGS. 19 to 27—to have at least two radially elastic, diametrically opposite spring arms 40 which are formed by longitudinal slots 38. Each spring arm 40 engages releasably, by means of a radially outwardly protruding, lug-like latching attachment 42, in a form-fitting manner, i.e. with an undercut of $\geq 90°$, into a corresponding latching opening 44 of the base part 28. In this case, the latching openings 44 are designed as radial passage openings, so that the latching attachments 42 can be reached from outside with a suitable tool for release purposes and can be moved radially inward, as a result of which the pipeline 6 can be removed together with the clamping ring 8 and the insert part 32 (arrow direction 18 in FIG. 2).

Figure 7:
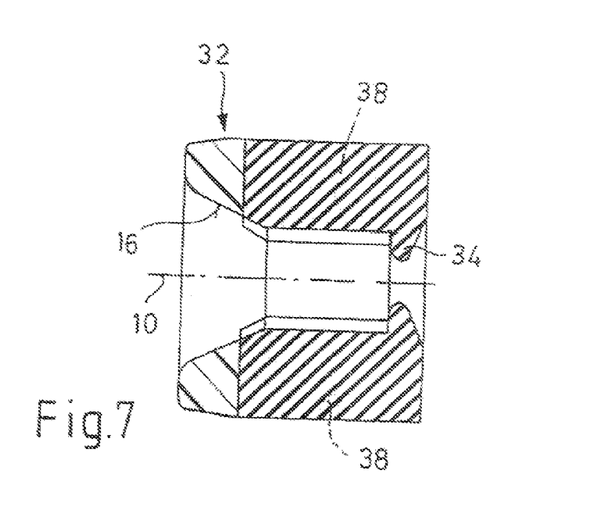
FIG. 7 shows a section in the plane VII-VII according to FIG. 5.
Figure 23:
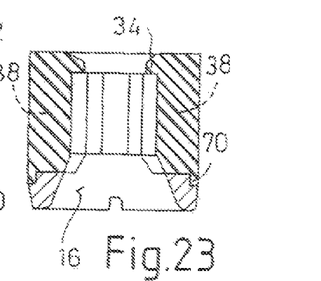
FIG. 23 shows a section in the plane F-F according to FIG. 20.
Figure 24:
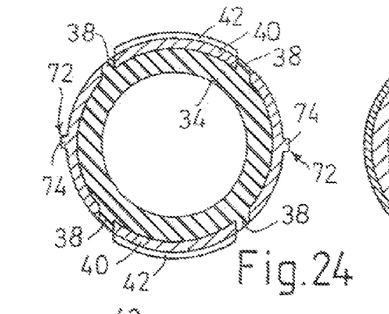
FIG. 24 shows a cross section in the plane C-C according to FIG. 20.
Figure 25:
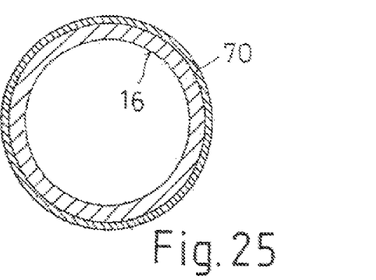
FIG. 25 shows a cross section in the plane E-E according to FIG. 22.
Figure 26:
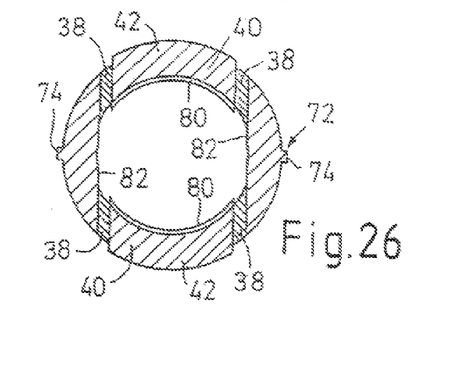
FIG. 26 shows a cross section in the plane D-D according to FIG. 20.
Figure 27:
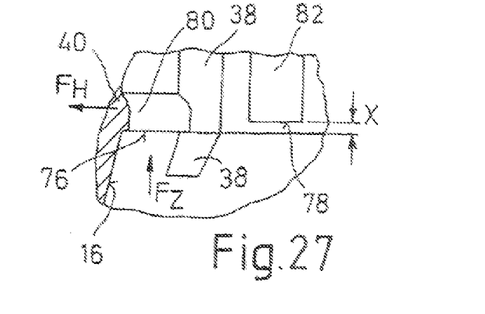
FIG. 27 shows, in an expedient refinement, an enlarged detail in the region A according to FIG. 21.

In the preferred refinement described, it is furthermore advantageous if the longitudinal slots 38 of the insert part 32 are completely filled with the material of the dirt seal 34 (see in this respect the section in the region of the longitudinal slots 38 in FIGS. 7 and 23). This refinement results in ensuring an optimum sealing against dirt because actual gaps are avoided even in the region of the longitudinal slots 38. Nevertheless, the elasticity of the sealing material filling the longitudinal slots 38 (in particular a TPE) permits the required radial movement of the spring arms 40. The above-described supporting sleeve 26 is expediently formed as a single piece with the base part 28.

In principle, the connecting device 1 may be a direct part of any desired assembly part (for example a valve block). However, in the embodiments illustrated, the housing part 2 can be connected to any desired further assembly part (not illustrated) via (at least) one connecting section 46. Various embodiments for this will be described below.

Thus, in the case of the embodiment according to FIGS. 1 to 4, the connecting section 46 is designed as a pipe attachment 48 for insertion into a receiving opening. This may also be a receiving opening 4 of a further connecting device 1 according to the invention. In the embodiment illustrated, the pipe attachment 48 is arranged, in respect of its longitudinal axis, at right angles to the plug-in axis 10, so that it is an angle connector. In this case, in a preferred refinement, provision is made for the base part 28 to be formed as a single piece with the pipe attachment 48 as a two-component molded part of plastic, the region of the pipe attachment 48 consisting of a relatively soft material, to be precise, in particular corresponding to the material of customary plastic pipelines 6, and the remaining region consisting of a relatively hard material. This refinement favors the securing of the pipe attachment 48 via a clamping ring corresponding to the clamping ring 8 by the tooth edge 12 being able to be readily pressed into the softer material. Furthermore, the soft component, in exactly the same manner as in conventional plastic pipelines, permits a later release of the insert part by radial deformability of the pipe/pipe attachment.

Figure 8:
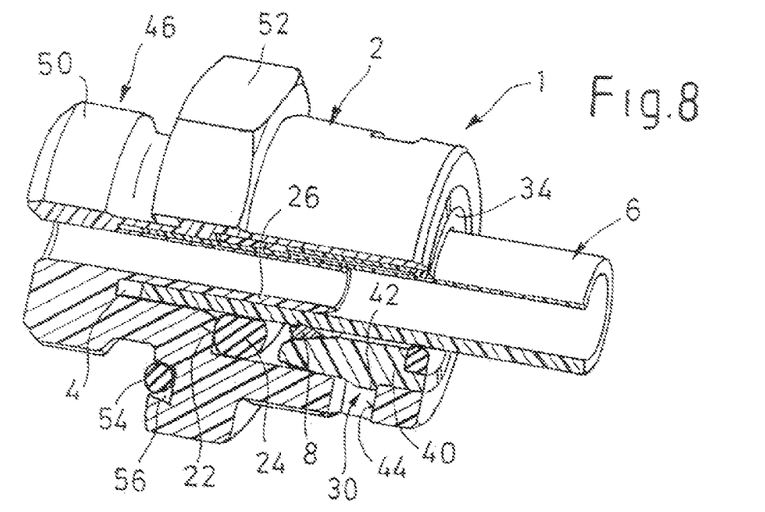
FIG. 8 shows a partially cutaway perspective view of a further embodiment of the connecting device according to the invention.
Figure 9:
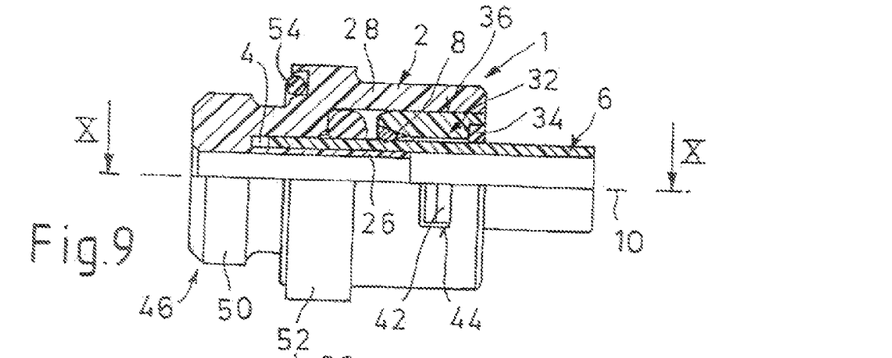
FIG. 9 shows a half cutaway side view of the embodiment according to FIG. 8.
Figure 10:
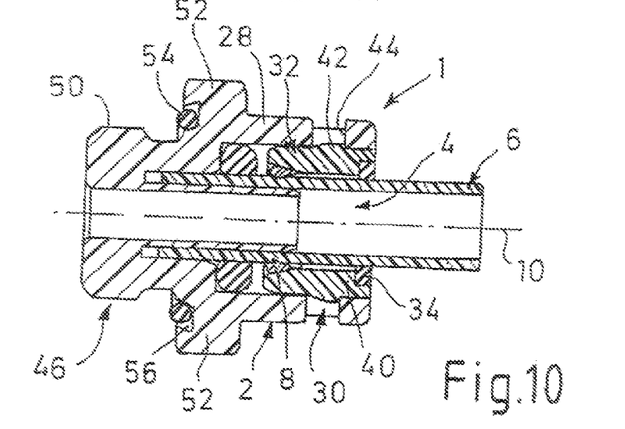
FIG. 10 shows an axial section in the plane X-X according to FIG. 9.

In the embodiment according to FIGS. 8 to 10, the connecting section 46 is designed as a screw thread attachment 50, in particular in the form of an externally threaded connector. In this case, a screwing axis of the screw thread attachment 50 corresponds to the profile of the plug-in axis 10. To screw the screw thread attachment 50 into a corresponding threaded hole, the housing part 2 has an actuating attachment 52 in particular in the form of an external hexagon. In order to seal off the screwed-in housing part from the particular assembly part, a sealing ring 54 is provided. As illustrated, this can be an axial sealing ring which is arranged in a corresponding receiving groove 56 on that end side of the actuating attachment 52 which points in the direction of the screw thread attachment 50.

In the embodiments according to FIGS. 11 to 18, the housing part 2 is designed in each case as a press-in cartridge which can be inserted (plugged-in/pressed-in) with a plug-in section 58 into a connecting opening of an assembly part (not illustrated). The connecting opening can be a simple, smooth-walled hole. It is advantageous in this connection if the connecting opening has a diameter which corresponds to the core hole diameter of a threaded hole which is provided for screwing in the screw thread connector 50 according to FIGS. 8 to 10. Such is the advantage that a manufacture of an assembly part can equip the particular assembly part in each case with the same core hole diameter, use then being made either of the embodiment according to FIGS. 8 to 10 or of one of the embodiments according to FIGS. 11 to 18. For the screw thread embodiment according to FIGS. 8 to 10, only the appropriate core hole with a matching thread needs also to be provided.

In the embodiments according to FIGS. 11 to 18, in order to provide a seal within the connecting opening, a sealing ring 60 is provided in the region of the plug-in section 58, this sealing ring 60 being arranged in a receiving groove 62. In order to secure the housing part 2 within the connecting opening, at least one radially protruding tooth element 64 is provided on the outer circumference of the plug-in section 58 for the form-fitting or frictional engagement in the connecting opening. It is particularly advantageous in this case if the plug-in section 58 has at least one tooth element 64 which acts in the manner of a thread such that the housing part 2, on the one hand, can be pressed in with the plug-in section 58 axially into the connecting opening and, on the other hand, can be removed from the connecting opening by unscrewing it. For this purpose, the housing part 2 preferably has, following the plug-in section 58, an actuating section 66, in particular in the form of an external hexagon element.

It should be expressly pointed out in this regard that these special refinements according to FIGS. 11 to 18 are in principle suitable for any desired housing part which can be inserted as a press-in cartridge into any desired connecting opening. In this respect, these features can also be used independently of the subject matter of claim 1.

Figure 11:
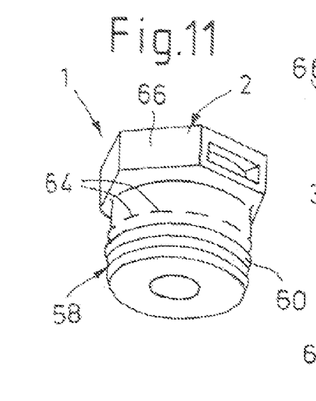
FIG. 11 shows a perspective view of a further embodiment of the connecting device.
Figure 12:
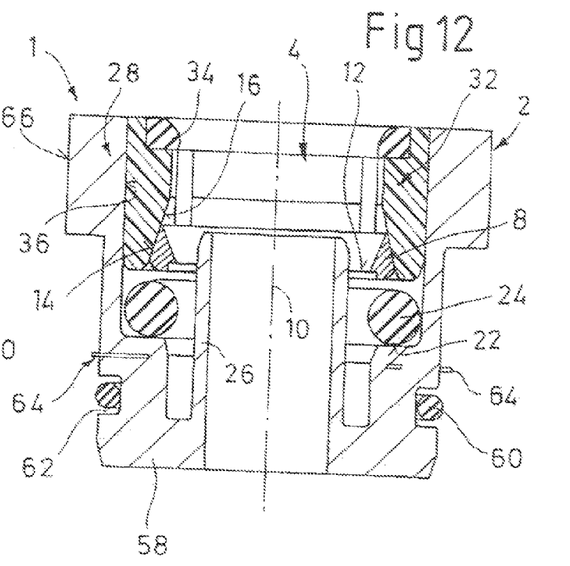
FIG. 12 shows an enlarged longitudinal section of the embodiment according to FIG. 11.
Figure 13:
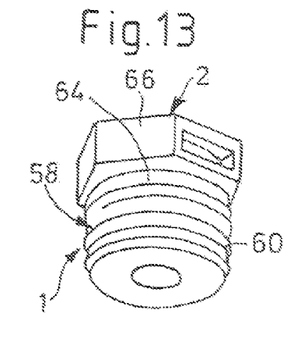
FIG. 13 shows a perspective view of a further embodiment of the connecting device.
Figure 14:
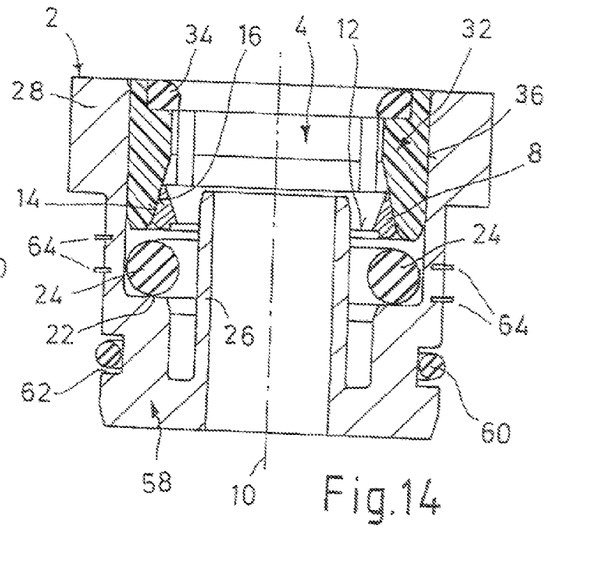
FIG. 14 shows a longitudinal section of the embodiment according to FIG. 13.
Figures 15, 16:
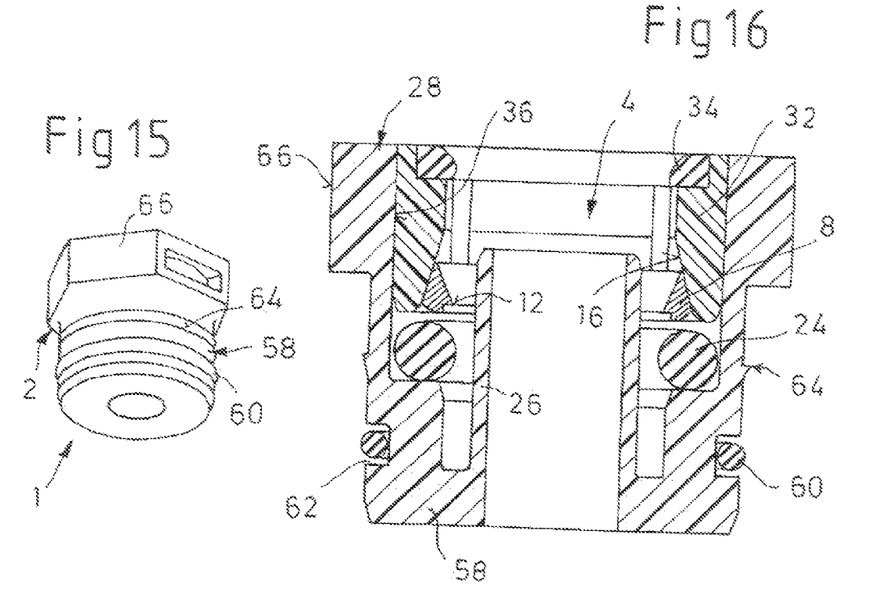
FIG. 15 shows a perspective view of a further embodiment of the connecting device.
FIG. 16 shows an enlarged longitudinal section of the embodiment according to FIG. 15.
Figures 17, 18:
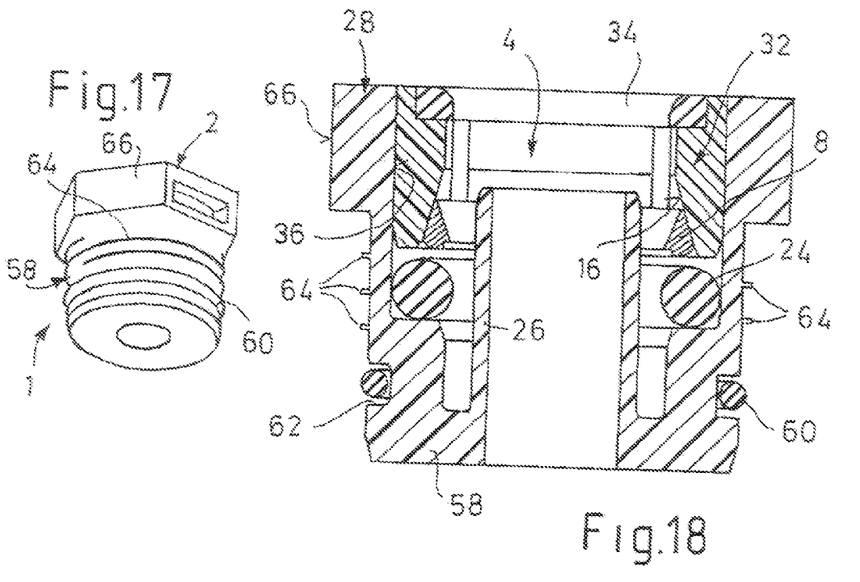
FIG. 17 shows a further exemplary embodiment of a connecting device again in perspective view.
FIG. 18 shows an enlarged longitudinal section of the embodiment according to FIG. 17.
Figure 19:
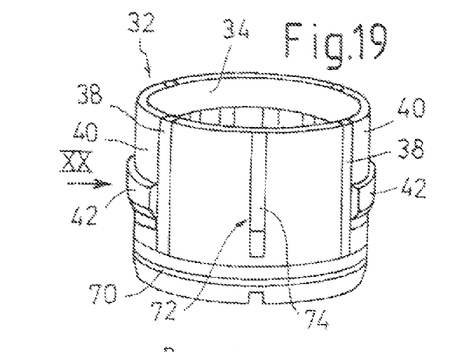
FIG. 19 shows a perspective view just of the separate insert part together with advantageous refinement features.
Figure 20:
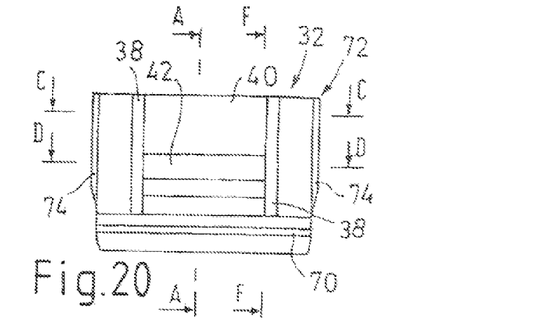
FIG. 20 shows a side view of the insert part in the arrow direction XX according to FIG. 19.
Figure 21:
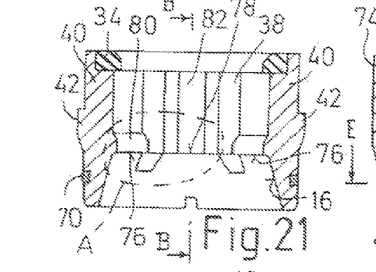
FIG. 21 shows a section in the plane A-A according to FIG. 20.
Figure 22:
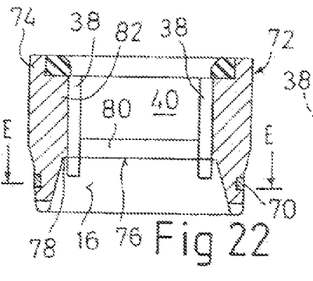
FIG. 22 shows a section in the plane B-B according to FIG. 21.

In the case of the embodiments according to FIGS. 11 to 14, the housing part or the base part 28 consists of plastic, with, in the case of FIGS. 11 and 12, a serrated ring of metal being embedded into the plastic material and protruding outward together with the tooth elements 64. In this case, the tooth elements 64 are uniformly distributed on a circle. In the case of the embodiment according to FIGS. 13 and 14, a strip-shaped metal band in the form of a spiral-line-shaped thread is embedded into the plastic material.

In the embodiments according to FIGS. 15 to 18, the base part 28 consists of metal, in particular brass, the tooth element or tooth elements 64 of the plug-in section 58 being molded on as a single piece. In the embodiment according to FIGS. 15 and 16, the tooth element 64 is an annular tooth edge. According to FIGS. 17 and 18, a spiral-line-shaped threaded edge is provided as the tooth element 64.

FIGS. 19 to 27 illustrate further preferred refinement features of the inset part 32. In this preferred embodiment, the insert part 32 first of all has an outer circumferential sealing bead 70 for sealing it off circumferentially with respect to the base part 28. In the preferred embodiment illustrated, this circumferential sealing bead 70 consists of a relatively soft, elastic material, and for this purpose, is molded on in particular as a single piece and with a cohesive material joint together with the dirt seal 34 and with the material filling the longitudinal slots 38 (see in this respect in particular FIG. 23). The circumferential sealing bead 70 therefore preferably also consists of a TPE (thermoplastic elastomer). As an alternative to this, the circumferential sealing bead 70 could, in principle, also be formed from a relatively hard material, for example the fiber-reinforced material of the insert part 32. However, the preferred embodiment of soft elastic material leads to particular advantages, specifically to a "soft sealing" and to low installation/removal forces when inserting or removing the insert part 32, since a press fit can be omitted.

Furthermore, the insert part 32 has positioning means 72 on its outer circumference for the automatic aligning (in particular for the self-centering and self-alignment in the direction of rotation about the plug-in axis 10) on insertion into the base part 28. In the exemplary embodiment illustrated in FIGS. 19 to 27, these positioning means 72 are formed by means of two diametrically opposite, radially projecting longitudinal ribs 74 which run axially in the insertion direction and can be introduced into corresponding longitudinal grooves of the base part 28 (not illustrated) in order thereby to align the insert part 32 in the correct position, so that the latching attachments 42 of the spring arms 40 can then latch correctly into the latching openings 44 of the base part 28.

In a further advantageous refinement, provision is made, in the embodiment according to FIGS. 19 to 27, for retaining edges to be formed within the insert part 32 following the inner cone 16 as an axial end stop against a movement of the clamping ring 8 that is directed in the pulling-out direction of the pipeline 6, to be precise, for first retaining edges 76 to be formed in the region of the spring arms 40 and for second retaining edges 78 to be formed in the regions situated between the spring arms 40 or in each case between the slots 38. The first retaining edges 76 are formed by radially inwardly projecting attachments 80 of the spring arms 40 (see in particular FIG. 21). The second retaining edges 78 are formed, according to FIG. 26, by radially inwardly projecting regions 82. The retaining edges 76, 78 permit high pull-off forces, which ensures great reliability against unintentional release of the pipeline 6. In a preferred refinement according to FIG. 27, provision may additionally be made to offset the first retaining edges 76 with respect to the second retaining edges 78 by an axial offset X in the direction of the inner cone 16 in such a manner that the clamping ring, when subjected to a force $F_z$ acting in the pulling-out direction of the pipeline 6, first of all only comes to bear against the first retaining edges 76, as a result of which the spring arms are subjected to a radially outwardly acting retaining-force component $F_H$. However, the axial offset X here is dimensioned to be small such that, after a deformation in the elastic region, the clamping ring additionally comes to bear against the second retaining edges 78, which improves the security against release. When the clamping ring 8 bears against the first retaining edges 76, there is therefore a breaking down of force, the radial component $F_H$ ensuring that the retaining force of the elastic spring arms 40 is increased. As a result, very high pull-off forces are achieved.

The invention is not restricted to the exemplary embodiments illustrated and described, but rather also includes all embodiments of equal effect within the context of the invention.

While the above description constitutes the preferred embodiment of the present invention, it will be appreciated that the invention is susceptible to modification, variation and change without departing from the proper scope and fair meaning of the accompanying claims.

The invention claimed is:

1. A connecting device for a plug-in connection comprising:
   a housing part having at least one receiving opening for the insertion of a pipeline;
   a clamping ring arranged in the receiving opening in order to lock the pipeline in place within the receiving opening;
   wherein an outer cone surface of the clamping ring interacts with an inner cone surface of the housing part;
   the housing part being made in two parts from a base part and an insert part, the insert part being connected to the base part via a snap-action form-fitting connection;
   wherein the insert part includes the inner cone surface;
   the insert part having a dirt seal for resting on the circumference of the pipeline in place within the receiving opening;
   the insert part being of a first, relatively hard and dimensionally stable plastic material;
   the dirt seal being of a second relatively soft and elastic plastic material;
   the second material being attached directly onto the first material to form a single piece with a material joint therebetween;
   wherein retaining edges are formed on the insert part following the inner cone as an axial end stop for the clamping ring;
   the insert part including at least two spring arms;
   wherein first retaining edges are located near the at least two spring arms;
   second retaining edges being situated between the at least two spring arms; and
   wherein the first retaining edges are offset with respect to the second retaining edges by an axial offset in the direction of the inner cone whereby the clamping ring, when subjected to a force acting in the pulling-out direction of the pipeline, comes to bear against the first retaining edges, and the at least two spring arms are subjected to a radially outwardly acting retaining-force component.

2. A connecting device for a plug-in connection comprising:
   a housing part having at least one receiving opening for the insertion of a pipeline,
   a clamping ring arranged in the receiving opening in order to lock the pipeline in place within the receiving opening;
   wherein an outer cone surface of the clamping ring interacts with an inner cone surface of the housing part;
   the housing part being made in two parts from a base part and an insert part, the insert part being connected to the base part via a snap-action form-fitting connection;
   wherein the insert part includes the inner cone surface;
   the insert part having a dirt seal for resting on the circumference of the pipeline in place within the receiving opening,
   the insert part being of a first, relatively hard and dimensionally stable plastic material;
   the dirt seal being of a second relatively soft and elastic plastic material,
   the second material being attached directly onto the first material to form a single piece with a material joint therebetween; and
   wherein the insert part has, for the purpose of being able to release the pipeline, at least two radially elastic spring arms having longitudinal slots in between the elastic spring arms,
   the at least two radially elastic spring arms engaging releasably, by means of radially outwardly protruding latching attachments, in corresponding latching openings of the base part in a form-fitting manner.

3. The connecting device as claimed in claim 2 wherein the longitudinal slots are filled with the material of the dirt seal.

* * * * *